Figure 1:
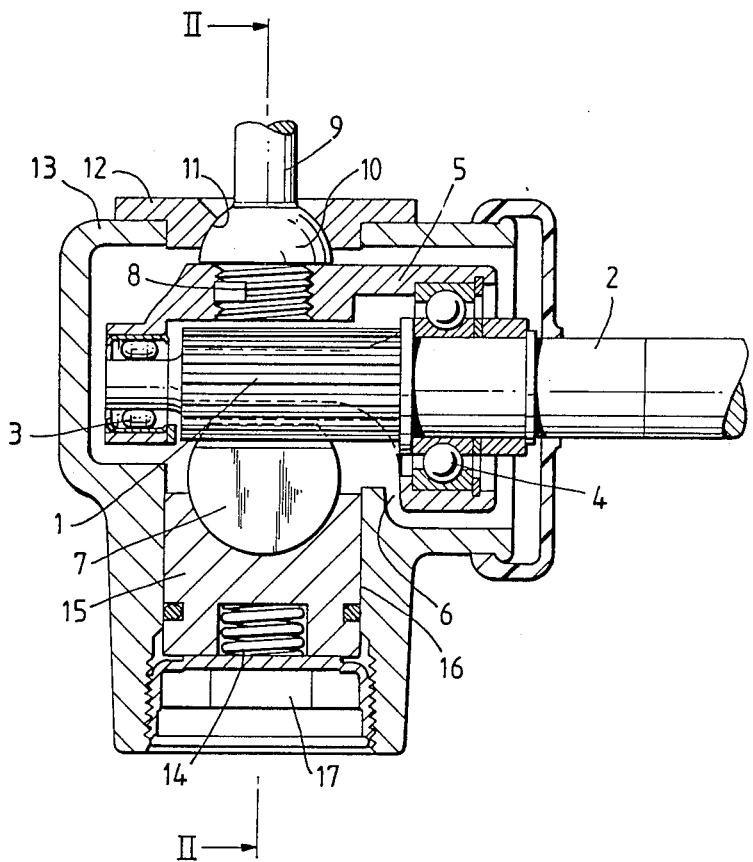

United States Patent [19]

Adams

[11] Patent Number: 4,865,150
[45] Date of Patent: Sep. 12, 1989

[54] POWER ASSISTANCE VEHICLE STEERING MECHANISMS

[75] Inventor: Frederick J. Adams, Clevedon, Great Britain

[73] Assignee: TRW Cam Gears Limited, Clevedon, United Kingdom

[21] Appl. No.: 186,047

[22] Filed: Apr. 25, 1988

[30] Foreign Application Priority Data

May 14, 1987 [GB] United Kingdom ............... 8711339

[51] Int. Cl.[4] .......................... B62D 5/09; B62D 5/22
[52] U.S. Cl. ..................................... 180/148; 74/498
[58] Field of Search ................... 180/148, 141, 142; 74/422, 498

[56] References Cited

U.S. PATENT DOCUMENTS

| | | | |
|---|---|---|---|
| 3,352,170 | 11/1967 | Adams | 180/148 X |
| 3,897,845 | 8/1975 | Von Löwis | 180/148 |
| 4,299,302 | 11/1981 | Nishikawa et al. | 180/148 |
| 4,354,422 | 10/1982 | Nishikawa et al. | 180/148 X |
| 4,401,180 | 8/1983 | Nishikawa et al. | 180/148 |
| 4,593,578 | 6/1986 | Kobayashi et al. | 74/498 |
| 4,607,717 | 8/1986 | Nakayama | 180/141 |

*Primary Examiner*—John A. Pekar
*Attorney, Agent, or Firm*—Tarolli, Sundheim & Covell

[57] ABSTRACT

In a power assisted rack and pinion vehicle steering mechanism, a rack and a pinion engage within a housing. The pinion is mounted on a pinion shaft which is journalled in bearings in a cage. A lever is fixed to the cage and projects from the cage through the housing. The lever has a part-spherical seating portion which engages a part-spherical seat in the housing. Spring means biases the rack into engagement wiht the pinion, and through the cage biases the part-spherical seating portion of the lever into engagement with the seat on the housing. Steering torque imparted on the pinion moves the rack axially and causes a reaction on the pinion which rotates the cage about the center of the part-spherical seating portion. This rocks the lever to actuate power assistance means.

4 Claims, 2 Drawing Sheets

POWER ASSISTANCE VEHICLE STEERING MECHANISMS

This invention relates to power assistance vehicle steering mechanisms which utilize a rack and pinion assembly.

It is well known in power assistance vehicle steering mechanisms using a rack and pinion assembly to utilise the reaction of the pinion on the rack during the application of steering torque for actuating a power assistance means. Many different mechanisms have been devised for communicating the movement of the pinion to actuate the power assistance means. One such mechanism is disclosed in the description of British Pat. No. 1144051 in which a rocking element is moved on steering torque being applied, this movement being transmitted through an articulated connection to operate the slide of a slide valve which forms part of the power assistance means. This mechanism and similar mechanisms previously proposed are complicated in construction and take up considerable space.

OBJECT OF THE INVENTION

It is the main object of this invention to provide a power assistance vehicle steering mechanism which is simple in design and which is compact in construction.

STATEMENTS OF INVENTION

According to the present invention there is provided a power assisted vehicle steering mechanism having a rack and pinion assembly, in which the pinion is mounted on a pinion shaft a portion of which is carried in bearings for axial rotation within a cage, a lever extending from part of the cage, said lever having a seating portion engaging a seat, the rack being urged into engagement with the pinion by a spring which also urges the seating portion of the lever into engagement with the seat, so that movement of the cage due to steering torque effects movement of the lever about the seat to operate power assistance means to augment steering.

The seating portion of the lever may be part-spherical and the seat may be part of or carried by the rack and pinion housing.

Conveniently, there may be two bearings mounting the pinion shaft in the cage, one on either side of the rack.

DRAWINGS

Figure 2:
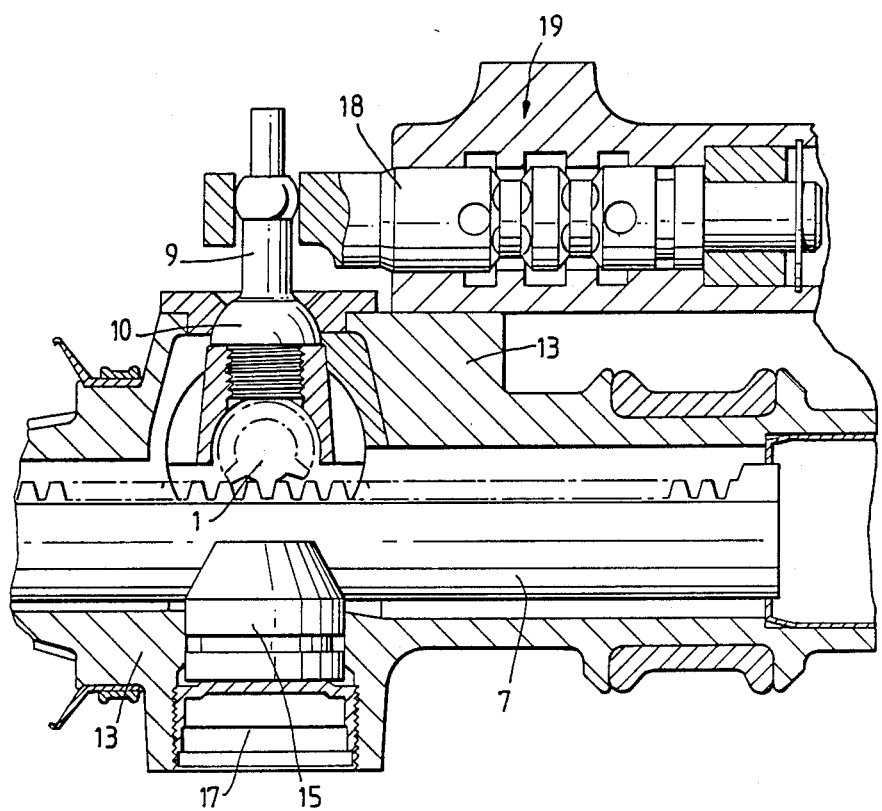

FIG. 1 is a cross-sectional view of mechanism constructed according to the invention; and FIG. 2 is a cross-sectional view on the line II—II of FIG. 1.

SPECIFIC DESCRIPTION

In the drawings, a pinion 1 is mounted on a pinion shaft 2 a portion of which is carried in bearings 3 and 4 in a cage 5. The cage 5 has an open lower part 6 to enable the pinion 1 to engage a rack 7. Screwed at 8 into the upper part of the cage 5 is a lever 9 which has a seating portion 10 which is part-spherical and which engages a seat 11 which is part of or which is an insert 12 in a housing 13.

The rack 7 is urged upwardly by a spring 14 and saddle 15 located in a bore 16 in the housing 13, the bore being closed by a screw-threaded plug 17.

As seen from FIG. 2, the lever 9 operates the spool 18 of a spool valve 19 and/or operates electrical contacts 20 (not shown). The spool valve will be part of a power assistance system and the electric contacts will energize an electric motor of an electrically driven hydraulic pump or alternatively of an all-electric power assistance system.

Torque imparted on pinion 1 by manual steering of the vehicle will move the rack for steering purposes and will cause a reaction on pinion 1 which will rotate cage 5 about the center of part-spherical seating portion 10. This will rock the lever 9 and actuate whatever power assistance means is provided.

It will be appreciated that the mechanism is compact and therefore requires little space for its location. This is achieved by the spring 14 urging the rack 7 into engagement with the pinion 1 and also urging the cage 5 upwardly and thus the seating portion 10 of lever 9 into engagement with the seat 11.

I claim:

1. A power assisted vehicle steering mechanism comprising:
    a housing;
    a rack axially displaceable relative to said housing;
    a pinion shaft;
    an axially rotatable pinion having one side engaging said rack within said housing whereby rotation of said pinion in response to steering torque effects axial displacement of said rack, said pinion being mounted on said pinion shaft, said pinion shaft being journalled in bearing means in a cage for axial rotation within said cage, said cage and said pinion being together displaceable relative to said housing in response to a reaction between said rack and said pinion upon the application of steering torque;
    lever means secured to and extending outwardly from said cage for controlling operation of power assistance means, said lever means having a part spherical seating portion disposed on the side of said pinion opposite from said rack, said part spherical seating portion of said lever means pivotally engaging a part spherical seat fixed relative to said housing; and
    means for biasing said rack into engagement with said pinion, said means for biasing also acting through said rack, said pinion, said bearing means and said cage to bias said seating portion of said lever into engagement with said seat, whereby displacement of said cage due to steering torque effects pivotal movement of said lever means relative to said seat to control operation of the power assistance means.

2. A power assisted vehicle steering mechanism as defined in claim 1 wherein said part spherical seat is formed as a part of said housing.

3. A power assisted vehicle steering mechanism as defined in claim 1 wherein said bearing means comprises first and second bearings spaced axially along said pinion shaft at axially opposite ends of said pinion.

4. A power assisted vehicle steering mechanism comprising:
    a housing;
    a pinion shaft;
    a rack axially displaceable relative to said housing;
    an axially rotatable pinion having one side engaging said rack within said housing whereby rotation of said pinion in response to steering torque effects axial displacement of said rack, said pinion being mounted on said pinion shaft, said pinion shaft being journalled in bearing means in a cage for axial rotation within said cage, said cage and said pinion being together displaceable relative to said housing in response to a reaction between said rack and said pinion upon the application of steering torque;

lever means secured to and extending outwardly from said cage for controlling operation of power assistance means, said cage having a curved seating portion disposed on the side of said pinion opposite from said rack, said curved seating portion pivotally slidingly engaging a complementarily curved seat fixed relative to said housing; and means for biasing said rack into engagement with said pinion, said means for biasing also acting through said rack, said pinion, said bearing means and said cage to bias said curved seating portion of said cage into engagement with said seat, whereby displacement of said cage due to steering torque effects pivotal sliding displacement between said curved seating portion and said complementarily curved seat to effect pivotal movement of said lever means to control operation of power assistance means.

* * * * *